United States Patent [19]
Rees et al.

[11] Patent Number: 5,924,239
[45] Date of Patent: Jul. 20, 1999

[54] CONTROLLER FOR AGRICULTURAL SPRAYERS

[75] Inventors: Steven James Rees; James Ian Rees, both of Croppa Creek; Andrew Muir Kinmont, Ferny Hills, all of Australia

[73] Assignee: Rees Equipment Pty Ltd., Australia

[21] Appl. No.: 08/817,841

[22] PCT Filed: Oct. 25, 1995

[86] PCT No.: PCT/CA95/00595

§ 371 Date: Apr. 24, 1997

§ 102(e) Date: Apr. 24, 1997

[87] PCT Pub. No.: WO96/12401

PCT Pub. Date: May 2, 1996

[30] Foreign Application Priority Data

Oct. 25, 1994 [AU] Australia ............................ PM9019
Mar. 17, 1995 [AU] Australia ............................ 14946/95
Apr. 26, 1995 [AU] Australia ............................ PN2620
Jun. 23, 1995 [AU] Australia ............................ PN3773

[51] Int. Cl.⁶ ........................ A01C 15/00; A01G 15/00
[52] U.S. Cl. ............................................................ 47/1.7
[58] Field of Search .............................. 47/1.7; 118/708, 118/707; 250/226, 222.1; 364/550; 404/84.1

[56] References Cited

U.S. PATENT DOCUMENTS

| | | | |
|---|---|---|---|
| 3,742,901 | 7/1973 | Johnston | 118/8 |
| 4,144,837 | 3/1979 | Johnston | 118/8 |
| 4,958,306 | 9/1990 | Powell et al. | 364/550 |
| 5,144,767 | 9/1992 | McCloy et al. | 47/1.7 |
| 5,279,068 | 1/1994 | Rees et al. | 47/1.7 |
| 5,294,210 | 3/1994 | Lemelson | 404/84.1 |
| 5,296,702 | 3/1994 | Beck et al. | 250/226 |
| 5,507,115 | 4/1996 | Nelson | 47/1.7 |
| 5,585,626 | 12/1996 | Beck et al. | 250/222.1 |
| 5,606,821 | 3/1997 | Sadjadi et al. | 47/1.7 |

FOREIGN PATENT DOCUMENTS 41 32 637 4/1993 Germany.
4132637A1 4/1993 Germany.

OTHER PUBLICATIONS

Saunders, Frederick A., "A Survey of Physics for College Students", Range of Electromagnetic Waves, Chapter 35, 550–566, Sep. 1930.

*Primary Examiner*—Thomas Price
*Assistant Examiner*—Fredrick T. French, III
*Attorney, Agent, or Firm*—Merchant, Gould Smith, Edell, Welter & Schmidt, P.A.

[57] ABSTRACT

A controller for agricultural sprayers utilises a detector (23, 123, 148) to generate red, blue and green colour signals across a field of view. The colour signals are used to generate a 'its green' or 'not green' output to switch a spray nozzle (13) detection of something deemed to be green. The algorithm which determines if there is something which is 'green', rather than 'not green', looks at the level of green component over the red and blue components in the colour signal and if both are exceeded then the decision is that it is 'green'. The level of green over each of red and blue can be compared against preset values to determine the 'green', 'not green' output. The level of green can be established by summing pixel by pixel over an area within the field of view under consideration to see if the sum for the area exceeds a set level to decide that the area is 'green' and requires spraying.

9 Claims, 9 Drawing Sheets

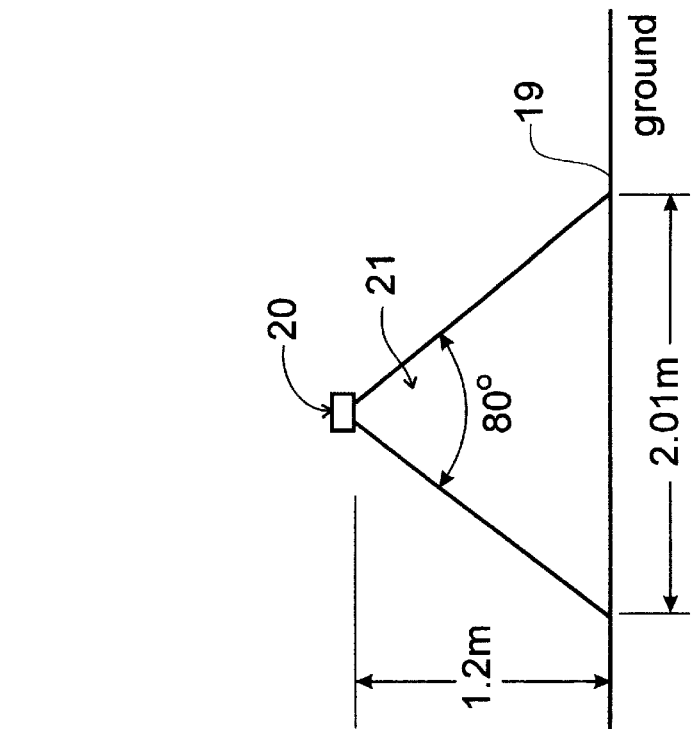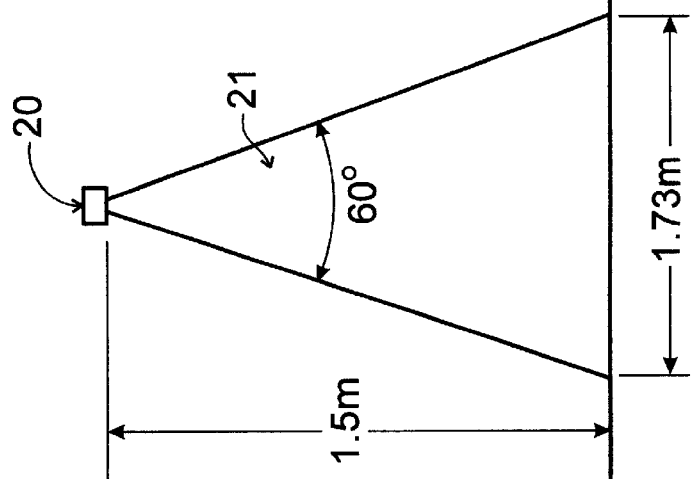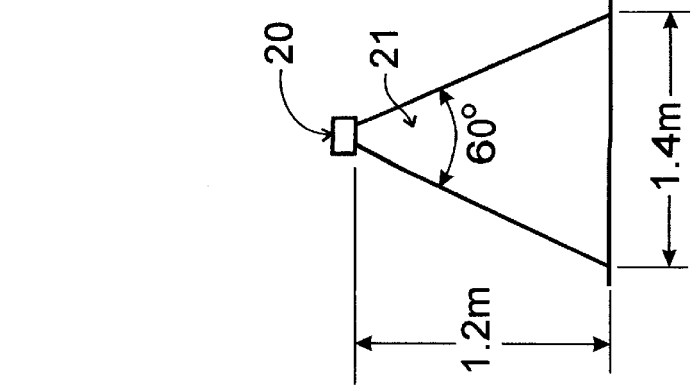

CONTROLLER FOR AGRICULTURAL SPRAYERS

FIELD OF THE INVENTION

THIS INVENTION relates to agricultural sprays used to spot spray weeds and the like. In particular the invention relates to a controller by which the spot sprays are selectively activated on determination of the existence of a weed.

BACKGROUND ART

AU-B-37775/89 (618377), the Australian national phase of PCT/AU-89/00267 (WO-89/12510), The Minister for Agricultural and Rural Affairs of the State of New South Wales, discloses a controller for agricultural sprayers where sensors measure the irradiance and radiance (or irradiance and reflectance) of a target area in two bands (eg. red and near infra-red) of the electromagnetic spectrum. The measurements are used to control the spray. Control involves a determination of the relationship between the ratios of the radiance (or reflectance) to the irradiance in each band respectively. The major flaw in this system is that it does not cope with changing light conditions or partly shaded areas in the viewing area. Further it does not provide a size selection function. The plant or weed size at which the controller acts is not able to be adjusted.

Colour analysis is the basis of a variety of discrimination systems operating in a range of circumstances. Examples are seen in U.S. Pat. No. 4,653,014 (Omron) and U.S. Pat. No. 4,797,738 (Tohken). These operate with video signals, operating on components therein to establish the existence of a target condition. In Omron there is seen a totally digital system which uses the R/S, G/S, and B/S signals (where S=R+G+B and R, G, and B are the red, green and blue components of the video signal). This system defines specific colour by analyzing its three signals with reference to upper and lower limits. In Tohken the signals Y (luminance), R−Y and B−Y are compared each with two limit values and analysis determines specific colour. Neither of these systems enables use with sprays in the field where an area which is predominantly green, a weed or other target plant, is to be found in an area of another colour, usually colours such as brown which return a green component in a camera output.

OBJECT OF THE INVENTION

It is an object of the present invention to provide a controller for agricultural sprays, which controller is able to function at normal operational speeds and under varying light conditions, to efficiently locate weeds and other target plants in the field. Other objects and advantages will hereinafter become apparent.

BRIEF SUMMARY OF THE INVENTION

In one aspect, the present invention resides in an agricultural spray controller by which detection of plants on a surface being treated is effected so as to enable the spot application thereto of a spray, said, spray controller comprising:

a spray activation means whereby to action a spray device to effect the spraying of a plant;

a control means for delivering a signal to the spray activation means to effect spraying on detection of a plant;

a detector generating a colour video signal provided in the control means for viewing an area of the surface to be treated and generating an output representative of the field of view; and control circuitry in the control means coupled to the output of the detector, said control circuitry analyzing the detector output and generating said control signal depending on the detection of a plant;

the control circuitry determining the existence of a plant by examining the colour components of the video signal, noting pixels which are predominantly green, and generating the control signal when the number of predominantly green pixels in an area of the field of view indicates the existence of a green plant.

Evaluation of various plants of interest and their typical backgrounds (soil, rock, stubble, etc) has shown that green foliage has a Green content higher than the Red and Blue content. The same also holds true for the so called colour difference signals, typically denoted as R−Y, B−Y, and G−Y, where Y is luminance. There are some advantages to working with the colour difference signals. The first is that by using the difference signals the effects of ambient light levels can be largely ignored. A second advantage is that CCD cameras with colour difference outputs are more likely to be available. In the ensuing discussion where the system is described without specific reference to luminance either form of signal can be worked with and the alternate form will be readily implemented by the person skilled in the art, there being no special skill required to make the adaptation required to enable use of one rather than the other.

The existence of the green colour of a target weed in the output RGB colour signal of a camera might be determined by a number of processes.

In one form of the invention the Green component of the RGB signal is compared separately to both of the Red and Blue components and if it exceeds both then an 'its green' decision can be made. In a preferred form of this type of controller a suitable selectable offset (setting the level by which the level of green is to exceed the level of red and/or blue) can be introduced so as to allow for different degrees of green of the weeds being treated. To determine if any pixel is green or not green, a simple analog comparison can be made between instantaneous R−Y and G−Y signals and also the instantaneous B−Y and G−Y signals. If in both cases the G−Y signal is greater, the pixel can be considered to be green.

In a preferred form of the invention the green state of a pixel is determined by operation of an algorithm wherein a pixel is deemed to be green when both of G>R and B<a set threshold for the blue component applies. This algorithm is preferable to the G>R and G>B algorithm above when the electronics to implement it is likely to be noisy and false green decisions are being returned. This is useful in low light conditions when present commercially available CCD cameras are in use. In this situation there is a component of noise present on the camera output signals. It has been found better to compare the B-Y signal to fixed reference voltage slightly offset from the signal level for black. This yields much better noise immunity while still providing a valid implementation of the above algorithm, since for a 'green' pixel the R-Y and B-Y signals are generally below the black signal level.

The detector can be any camera generating a colour output and typically it can be based on use of solid state devices such as charge coupled devices (CCD). The intensity of light which the device is to work with can vary considerably in open conditions and performance is enhanced by use of a hood whose function is to smooth out any marked light variation.

The detector and control circuitry which is used in the present invention is ideally able to locate weeds against a variety of backgrounds such as black basalt soils, red soils, bare ground, stubble covered ground, rough rocky ground, changing light conditions, etc. It is found that a solid state detector such as a CCD based detector is best operated slightly out of focus so as to avoid false triggers which may otherwise arise when traversing ground having varying characteristics.

The circuitry which operates on the detector's signal is preferably able to perform its analysis in a short time so as to better typical efficient travel times of an agricultural spray. This is more readily enabled at lower costs by means of analogue circuits for processing the detector output.

The detector of the invention is used to convert an image of an area which is covered by the spray to a signal stream containing data which is equivalent to a picture frame which, when a solid state device is used typically comprises an array of pixels. The Red (R), Green (G) and Blue (B) components (RGB) of each of the pixels can be operated on to establish the green state of each pixel. A decision to spray might be based on the green state of a set of particular adjoining pixels or alternately the total or summed green component of a set length of a number of successive scan lines can be determined as the basis of the decision. These operations can be performed using either of digital or analogue techniques, or a combination thereof. The final green state which is calculated, is to determine a result being either a spray on, or a spray off decision.

The implementation of the above might be by way of circuitry providing a largely hardware approach to the problem of when to activate a spray or it might involve operations performed largely within a processor which is programmed to perform the desired functions.

BRIEF DESCRIPTION OF THE DRAWINGS

To enable the invention to be more fully understood, various preferred embodiments of the invention will now be described with reference to the accompanying drawings, in which:

FIGS. 2A, 2B and 2C are diagrammatic views of how the field of view of a sensor unit may be utilised to advantage in the invention;

DETAILED DESCRIPTION

Figure 1:
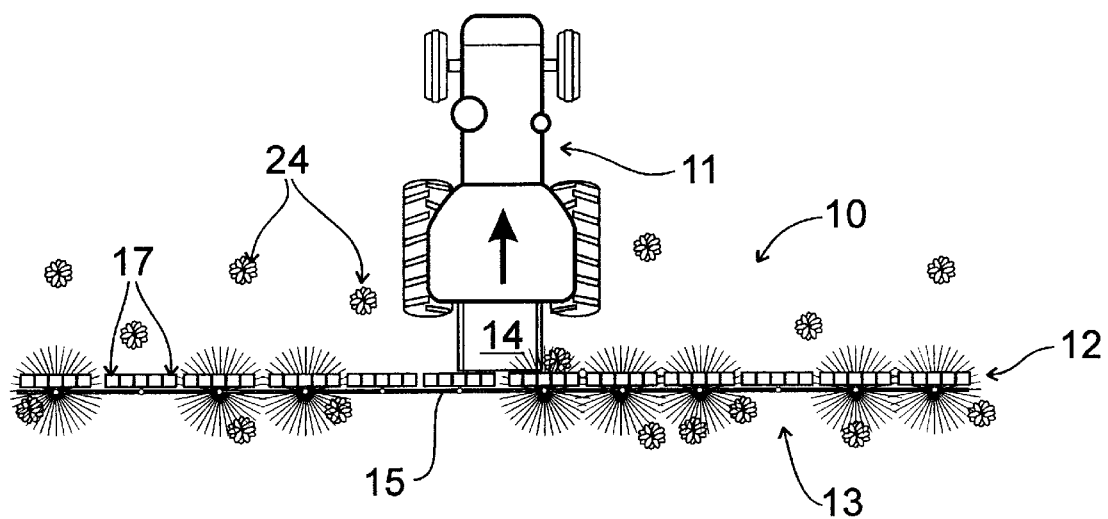
FIG. 1 is a schematic plan view of an agricultural sprayer fitted in accordance with the present invention.

The agricultural sprayer 10 is typically comprised of an extended boom, or booms supporting a linear array, or arrays of spray heads therealong, which boom, or booms, is or are trailed by, or mounted on a tractor 11 or other like type prime mover. Boom 12 can be fitted with a plurality of spaced apart, individually operable, spray heads comprising spray nozzles 13, arrayed therealong and ideally at regularly spaced intervals. The spray nozzles 13 can be connected to one or more spray tanks such as spray tank 14 by suitable pipes, lines or conduits 15, either individually or off a manifold. The spray heads may be any of those known in the art. A standard valve, as utilised in the agricultural spray field can provide the means whereby a single spray head is able to be selectively operated. Valve 16 selectively allows the flow of spray chemicals from piping 15 to the nozzles 13, each nozzle 13 being selectively operable by selective activation of its respective valve under control of a controller connected thereto typically via a selectively operable activator. This is ideally achieved by electrical means with the controller switching sprays on via use of solenoids which open selected valves in the supply line, or lines to activate their respective spray heads. All of these elements can be chosen from amongst a range of readily available, off the shelf lines which will be selected according to standard criteria known to those in the art.

Figure 3:
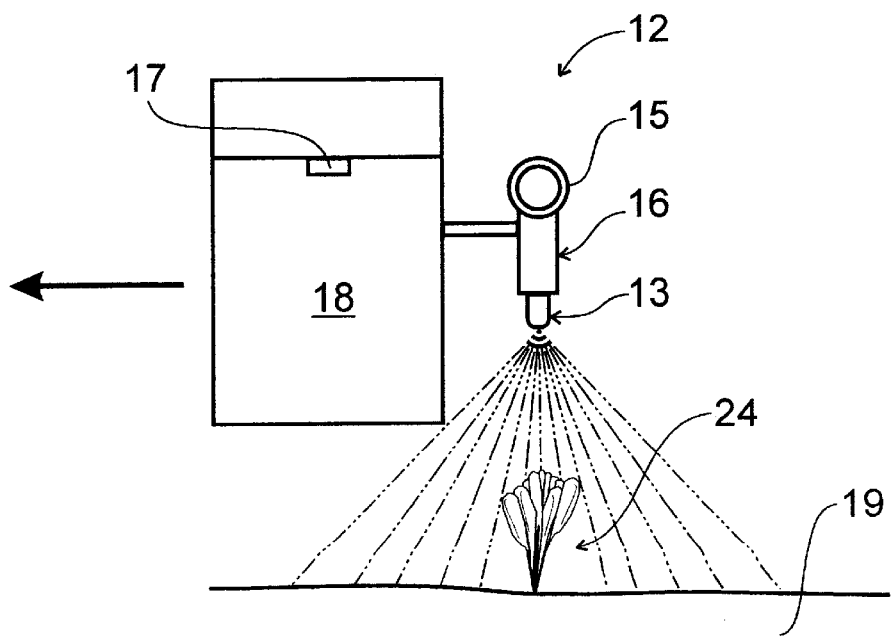
FIG. 3 is a side view showing a spray nozzle spraying a weed detected by the sensor unit.

A plurality of the detectors can be provided on the boom 12 of FIG. 1. They can be arrayed therealong so as to cover the width of ground spanned by the boom. The field of view of a single one of the detectors may be such as to cover the ground beneath a number of adjacent sprays so that a detector is not required for each spray head. As seen in FIG. 3 a detector, typically a CCD based type detector 17 can be mounted in a housing, enclosure or hood 18 which is open at its bottom and which is arranged to be passed over the surface 19, on which there may be weeds to be sprayed, as the tractor draws the boom thereover. The surface being treated will typically be a field being prepared for a new crop, the field being either cleared of the last crop or having a stubble thereon. The housing 18 can be an opaque hood which is ideally arranged so as to stop all direct light falling on the target area and that way causing deep shadows therein. The hood 18 acts to diffuse light in the target area, the light being that which passes under the hood, into the field of view of the detector 17.

When a CCD type detector 17 passes over bare soil or stubble, the CCD therein converts the image below into an output comprising a string of pixels each characterised by respective RGB components. The controller can then determine the greenness of each pixel by manipulations of its components. The signal which is output by the detector 17 can be examined to determine if the weed covers an area of greater than a preset size. If the green signal exceeds a preset threshold limit at which the spray is to be activated, the valve 16 can be activated to switch flow to the appropriate spray nozzle 13 to spray the weed 24 (see FIG. 3). The circuitry interconnecting the detector 17 and the nozzles 13 can incorporate a time delay so that the spray nozzle operates for a preset time so that all of a target weed's area is sprayed as the boom moves over it.

One CCD detector can run a number of spray heads, depending on the width of its viewing area, and generally four is typical. The distance from the camera to the ground is the factor which determines this. For example, if it is desired to use one camera to run six spray nozzles then the camera may be set higher to cover a greater area at the ground (see the comparison shown between FIGS. 2A and 2B). Alternatively it is possible to use a wider angle lens (comparison shown between FIGS. 2A and 2C). In reference to FIGS. 2A, 2B and 2C, 20 is the camera head, 21 is the viewing angle.

The selection of height of the camera and the lens characteristics will ideally be decided depending on what in field conditions the machine incorporating the controller is working with in working with a wheat stubble, an acute angle lens mounted higher will allow it to look more effectively down into the stubble whereas in the normal bare fallow, a wider angle lens could be used to look out further. The screening effect of stubble is enhanced as the viewing angle decreases and the vertical stalks more effectively hide a small or flat weed not raised to the same degree above ground level.

The light diffusing hood's dimensions are not at all critical. The dimensions will be varied to allow it to be fitted to different booms. The hood is constructed and mounted to keep direct light from the viewing area.

If external lighting is to be used to allow night time operation, an even white light mounted in the light diffusing hood could be used.

Figure 4:
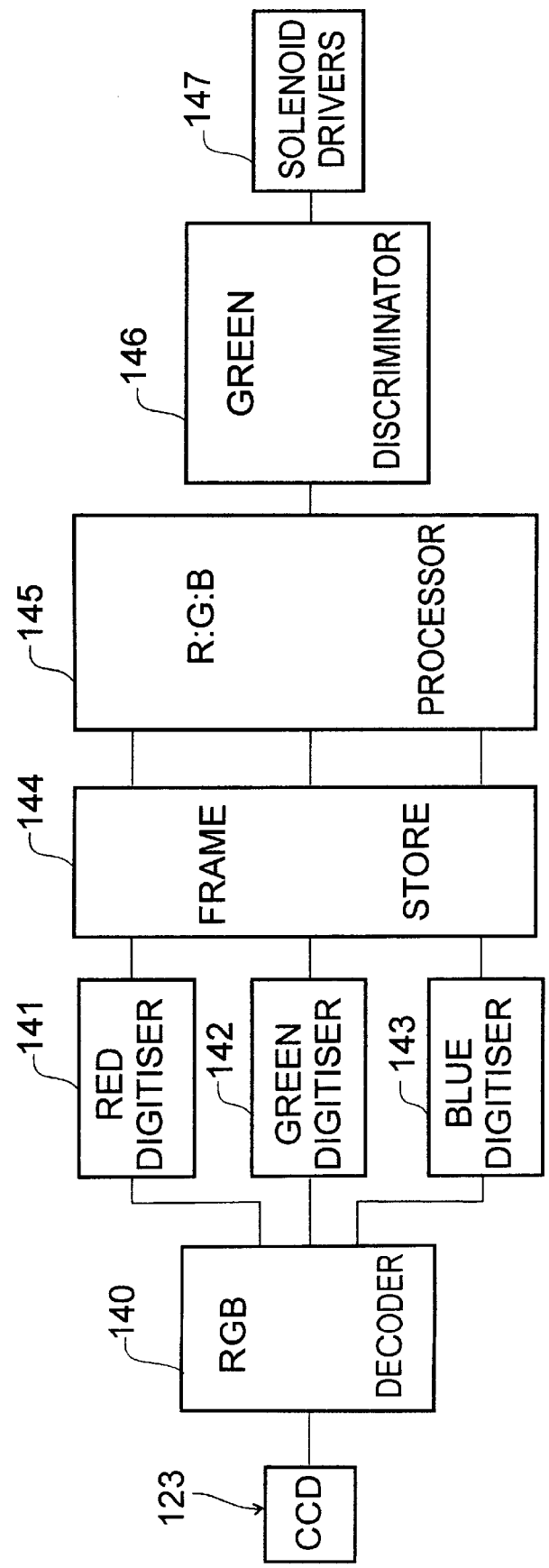
FIG. 4 is the diagram of a circuit which may be used in a controller in accordance with the present invention.

Referring now to FIG. 4, the output from the CCD 123 is fed through an RGB decoder 140 and respective Red, Green and Blue digitizers 141–143 and then to a frame store 144. In the frame store the RGB components of the output of the CCD 123 can be stored in digital form. The information in the frame store 144 can be passed via RGB processor 145 to a Green discriminator 146 which monitors the level of the Green component using an algorithm such as the one described below in greater detail requiring both of G>R and G>B to exist in a pixel before it is deemed to be green with some consideration of the number of green pixels in an area before the decision is made to call the area in the field of view green and a weed. Alternately the algorithm which is operated can be G>R and B<a set value its described elsewhere herein. The discriminator 146 can operate a solenoid driver 147 which is operably connected to a valve associated with spray nozzle to activate it and spray the detected weed.

A size selection section can be employed. This size selection section can be used to check the number of green pixels in an area of the target area and if their number is above a preset threshold, it can activate the solenoid to control the flow of chemicals to the spray nozzle. The threshold could be made adjustable so that it can be varied to allow an operator to select the size of the plant to be detected.

The horizontal field of view of a detector can be divided into a number of smaller regions to allow a single detector and processing section to control multiple valves and associated sprays which can be activated by solenoids under control of the controller.

The digital circuit of FIG. 4 has two areas which add considerably to the cost and complexity. The first is that having the digitizers at the output of the detector means that the amount of data to be stored in the frame store for a frame of video data is high (of the order of 1 Mbyte). The second is that in order to have a reasonable range of colour levels to process, 6 or 8 bit digitizers are required, which for video applications are rare and expensive.

Figure 5:
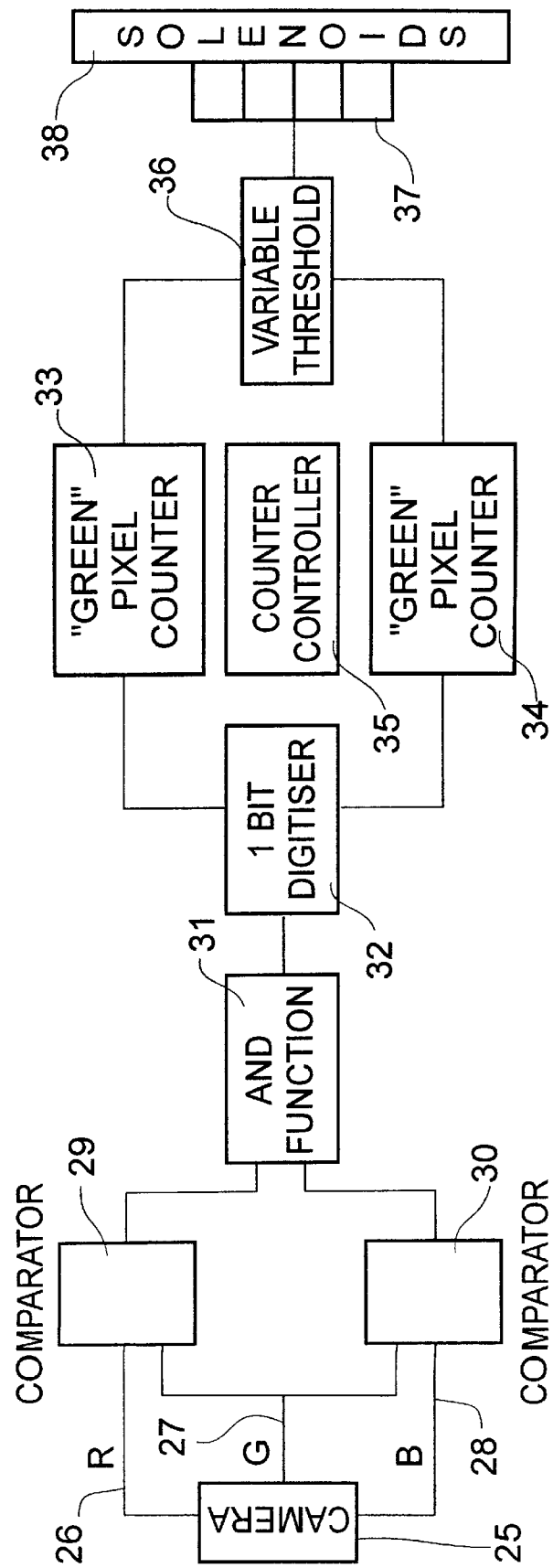
FIG. 5 is a circuit diagram showing another form for the circuitry for a controller in accordance with the invention.

In the embodiment of FIG. 5, the front end processing can be performed using analog componentry. In this case, only a 1 bit digitizer is required since the result of the comparison is either "green" or "not green". It should be noted that by using this analog implementation, the memory requirements in the frame store are eliminated and no expensive digitizers are required. The digital processing requirements are substantially reduced and the whole system speeded up.

Where determining the number of adjacent pixels digitally can be complex and expensive. A simpler and cheaper method to operate is one which counts the total number of green pixels in the horizontal lines instead of the number of adjacent green pixels and count adjacent vertical lines. FIG. 5 is a schematic illustrating the components of a circuit which can be used in the controller wherein an "is it green" algorithm is implemented at the front end. The detector 25 outputs its usual RGB components on respective lines 26, 27 and 28 respectively, connected in pairs to comparators with pair 26 and 27 fed to comparator 29 and 27 and 28 fed to comparator 30 which each produce a logic "1" (high) when the green component of the detector output is higher. The respective comparisons are examined by the AND circuit 31 and if both the comparators are logic "1" (high) ie, G>R and G>B, then a green signal, logic "1" (high) is passed to the one digitizer 32. The level of Green over Red and Blue can be made adjustable in the comparator circuits 29 and 30 by either enhancing the G signal or retarding the Red and Blue signals, so as to allow adjustment to take account of weeds with different green characteristics. If the comparator which determines G>B is disconnected from the green component in the detector output and its comparison is with a set value then the circuit will work with the algorithm requiring both of G>R and B<the set value to apply.

From the 1 bit digitizer the circuit feeds counters which may be ideally set up in a microprocessor under software control to implement the further processing of the detector output. The one bit digitizer increments either counter 33 or 34 depending on which region is being analyzed, with a programmable threshold therein, and if the number of green pixels in the line of the region being looked at exceeds this threshold then that line is considered green by storing a logic "1" in memory. Once all the lines in the region are analyzed and results stored, then the number of green lines are counted and these also have to exceed a preset threshold (Number) if a spray signal is to be generated. By using this two count method the width and height of a weed is determined. This reduces the amount of memory required while still providing similar results, at faster speed and as before the threshold can still be varied to allow selection of the plant size to be detected. For example, if the horizontal field of view of the camera is divided into four regions, the counting of the "green" pixels can be performed before any data is placed into the memory resulting in only 4 bits of data for each horizontal scan by the camera instead of perhaps 640 bits of data (80 bytes). This represents a reduction in the amount of data to be processed of over 90%.

The signal generated by the detector typically includes components for the three colours,' RGB, with each component characterised by both of hue and luminance. In the above set out front end algorithm, the RGB components can be the detector's values minus a factor which can be the luminance (Y) of the camera signal so as to work with pure colour signals. Depending on which camera is chosen, its output may be signals which are the equivalent of colour minus intensity. In the working with the signals R–Y, G–Y and B–Y, the controller is working with the pure colour components. These signal levels are normalised so as to produce more significant ratios at the comparators 29 and 30.

There are circumstances when the G>R together with G>B principle will break down.

Extreme intensity variations can adversely affect performance by making a CCD device for example underexpose or saturate. However, intensity variations can be smoothed out by use of the above described light diffusing hood.

In another circumstance, a specific gold colour has green higher than red even though it is not greenish. This problem might be overcome by seeing how close to G and R signals are and how close the G and B is. This is because the gold colour has a close G and R and nearly no blue.

In yet another circumstance, the CCD camera views dead (golden coloured) grass and sees the dark area in between the dead leaves with a green hue. This causes false triggers.

As the size of the dark areas are generally small, size adjustments could be used to cut them out. However, size adjustment would limit the effectiveness of the size selectability by which a minimum size of weed to be treated is set. Also, the size of the dark area varies with changes in brightness during the day. One solution of this problem is to vary the focus of the camera slightly off normal. This smears out these particular dark areas to cut the number of false triggers and they can be all but eliminated. The affect of focus could be reproduced within the electronics but as this increases complexity, it is best to work within the camera's focus. Focus is an analogue solution to a problem which might be worked digitally but at added cost.

In FIG. 5, the circuit can account for when a "green" plant is straddling the boundary between two regions in the camera's horizontal field of view. Since it is customary to set up the spraying equipment to have an overlap region between adjacent spray nozzles, it is logical that an overlap region should also exist between adjacent regions in the "green" detection system. This can be performed as seen in FIG. 5, by utilising two independent counters 33 and 34 to count the number of "green" pixels, and control when they start and stop so as to provide an overlap in the counting regions. This is seen in FIG. 5 wherein separate green pixel counters 33 and 34 are switched by a counter controller 35 and their total is compared with a threshold set by variable threshold 36. The counters are synchronised so that counter 33 counts pixels in segment 1 (eg, pixels 0 to 140). Counter 34 counts pixels in segment 2 (eg, pixels 120–240). This gives an overlap at pixels 120 to 140 when a weed is straddling this area. Counter 33 then counts segment 3 whilst counter 34 counts segment 4. This is repeated through the range of pixels returned by the camera. Control counter 35 counts the range and resets the "green" counters 33 and 34.

As stated above the examination of the detector output to determine the existence therein of a weed can involve, use of a microprocessor which performs the algorithm and establishes the green state of an area. FIGS. 6 to 9 show in flow chart form the sequence of operations by which a spray activation signal might be generated. This is illustrated with reference to the G>R and G>B version and area calculation based on a scan line approach.

Figure 6A:
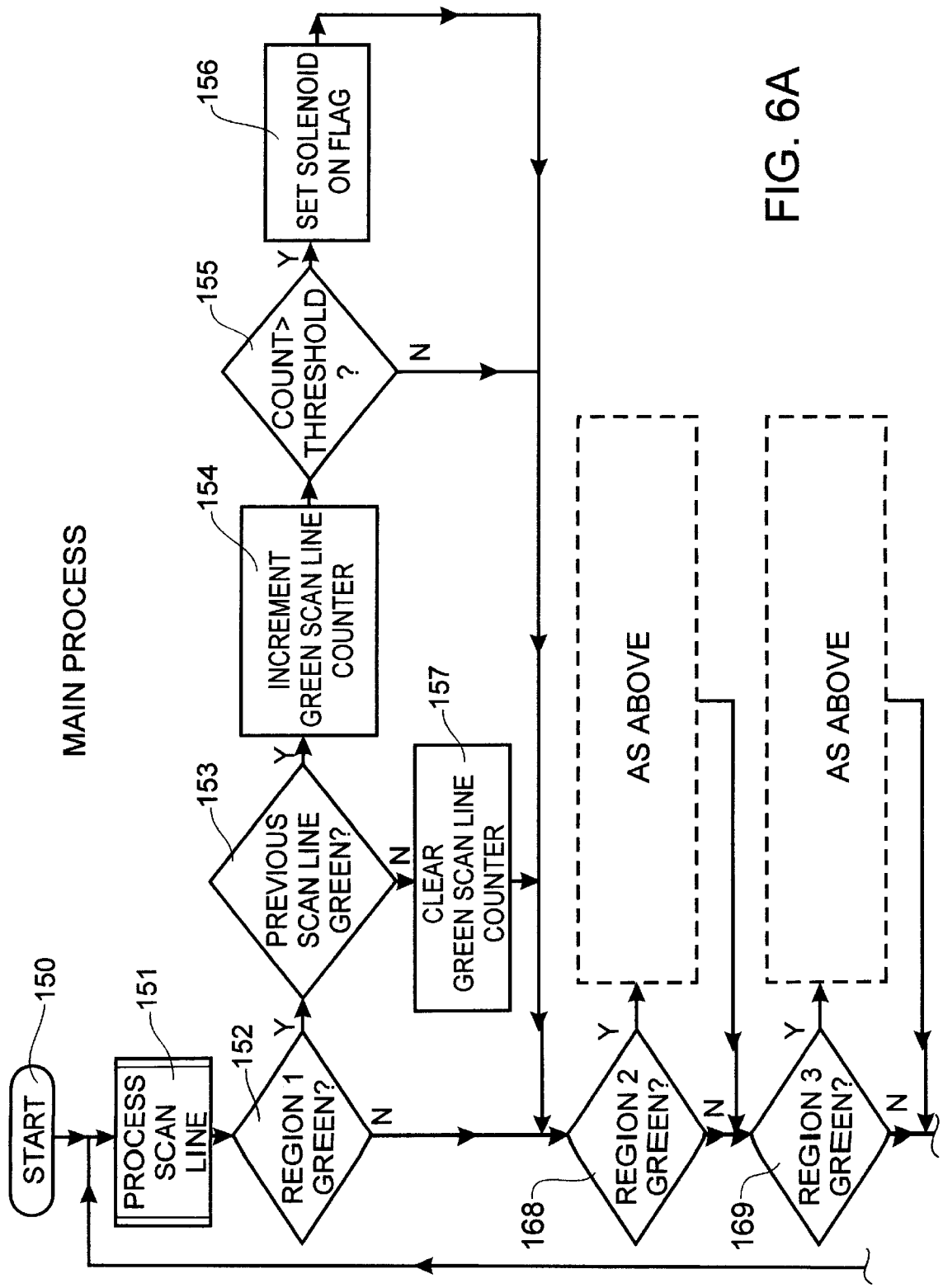
FIGS. 6 to 9 illustrate a decision making process as might be implemented to determine if a detector output contains a plant to be sprayed.
Figure 6B:
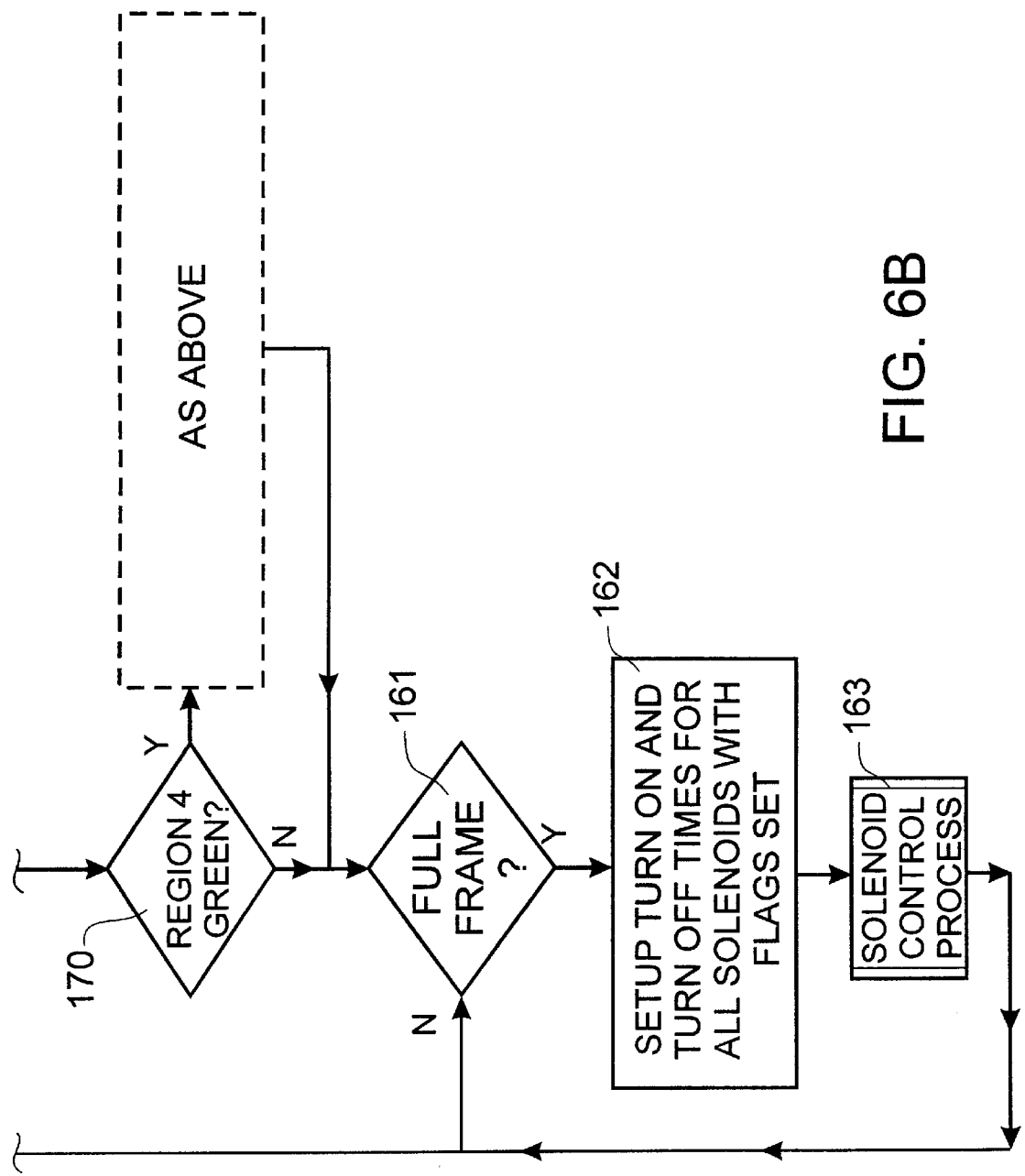

FIG. 6 shows the main process operating with four regions (associated each with one of four spray heads). On start up at 150 the scan line process 151 (described below in greater detail with reference to FIG. 7) is implemented. If the first region of a scan line is deemed to be green and the previous scan line was green in this region, see 153, then counter is incremented at 154 otherwise it is cleared at 157 and the second region is processed (158) in the same manner. If the scan line counter for region 1 is incremented at 154 then the count is compared at 155 with a threshold and if it exceeds it then a solenoid on flag is set at 156 otherwise processing passes to region two. The forgoing processing is pursued through the third (159) and fourth (160) regions till the full frame is determined to be completed at 161. At this point turn on and turn off times are set for solenoids whose flags are set and processing passes to the solenoid control process at 163 (described below in greater detail with reference to FIG. 9.

Figure 7:
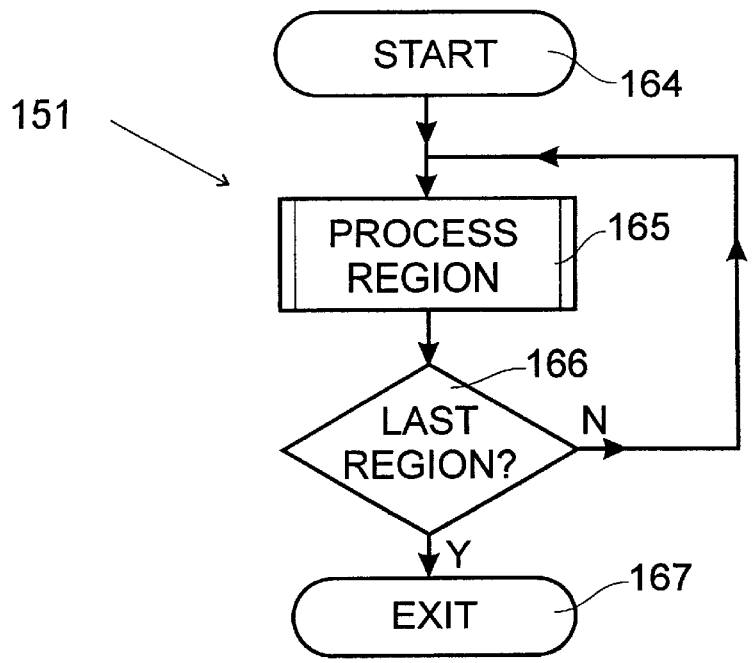
Figure 8:
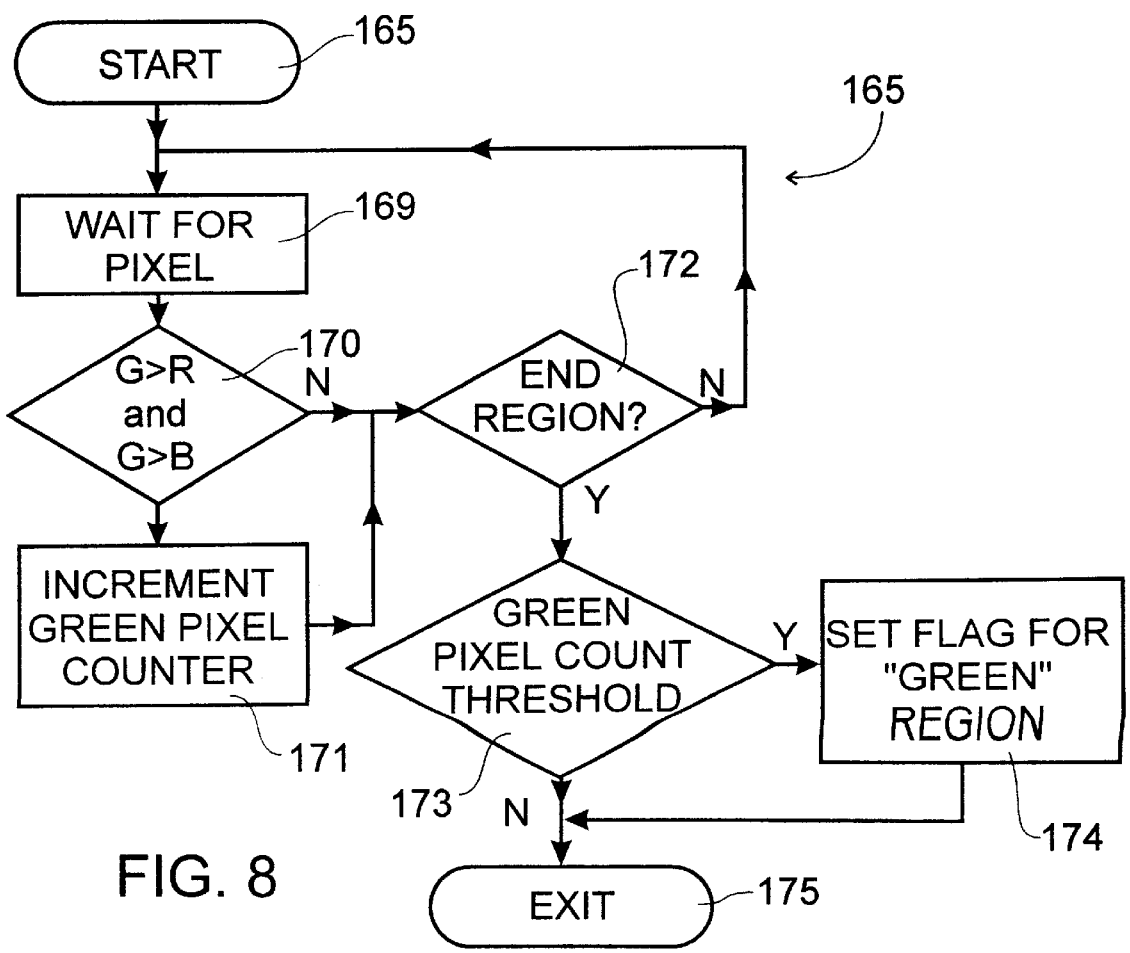

The scan line process at 151 of FIG. 6 is seen in greater detail in FIG. 7. On starting the scan line process at 164 the region process (described below in greater detail with reference to FIG. 8) is implemented. If the last region on a scan line is determined to be processed at 166 then the scan line process exits to the is it green decision process at 152 of FIG. 6 otherwise the scan line process loops. The region process at 165 is seen in FIG. 8 wherein on its commencement at 168 the detector output is examined pixel by pixel. On receipt of a pixel at 169 the algorithm G>R and G>B is implemented at 170. If both conditions apply then a green pixel counter is incremented at 171 otherwise and the end of region is tested at 172 with processing looped to continue if the end of region is not reached. When it is processes continues with the green pixel count compared to a threshold at 173. If the threshold is exceeded then a green region flag is set at 174 and processing passes back to the scan line process.

Figure 9A:
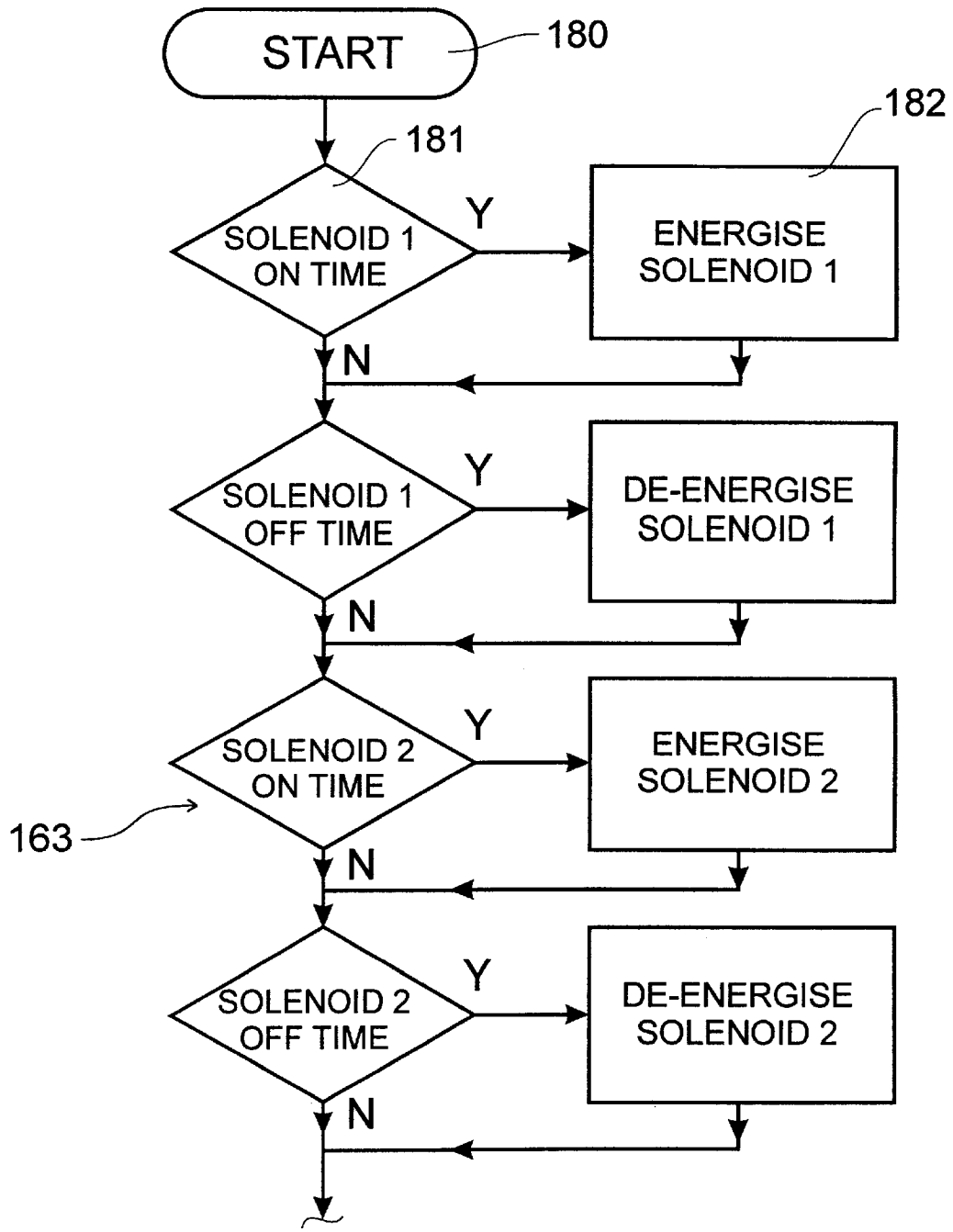
Figure 9B:
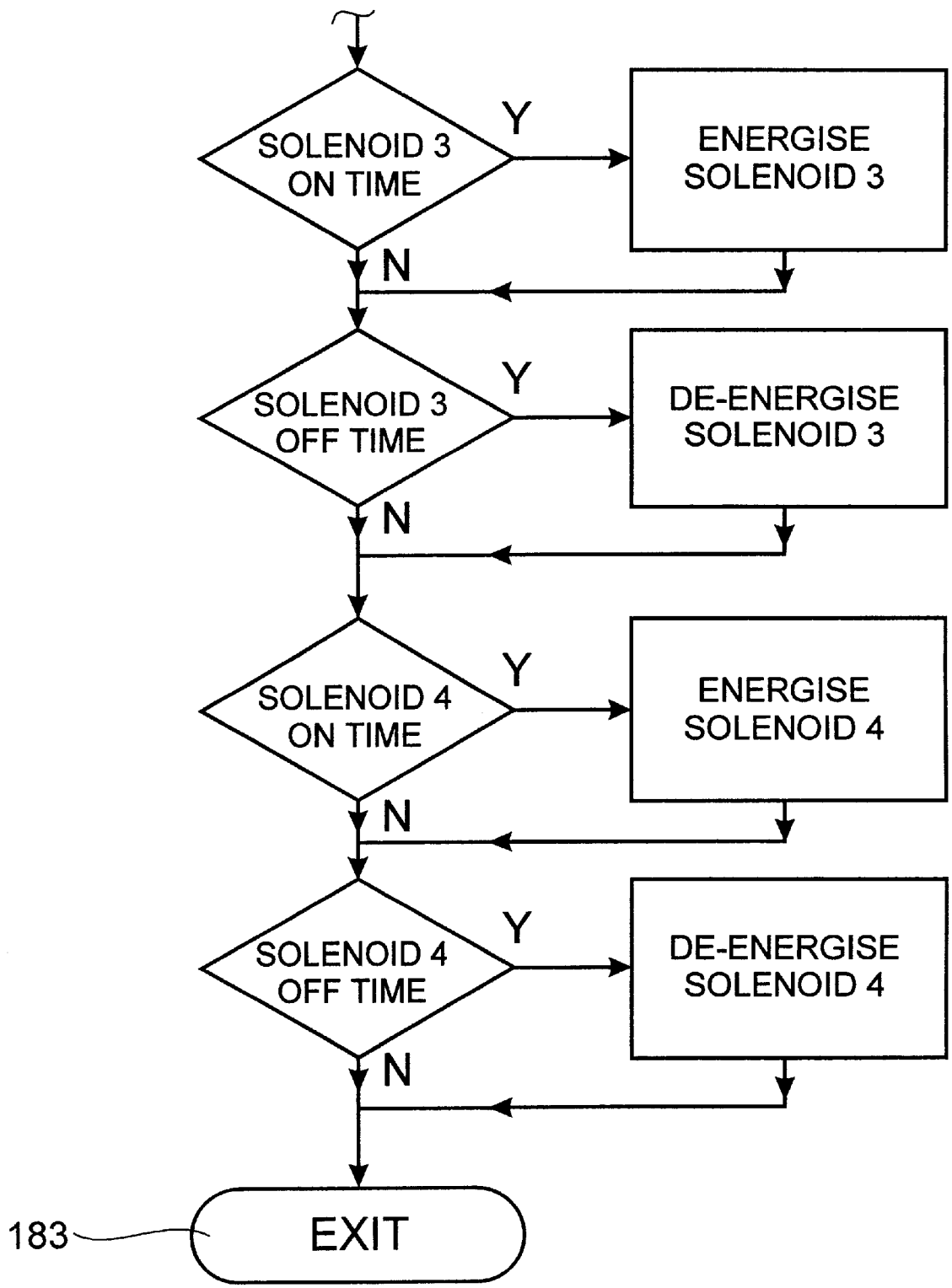

The solenoid control process is seen in greater detail in FIG. 9. When the turn on and turn off times have been set for solenoids whose flags are set (see FIG. 6) the solenoid control process is run. If a solenoid on state is indicated at 181 the solenoid is energised at 182 and so on through the set with this program exited at 183 and processing returning to the main process. At some cycle through the solenoid process a solenoid off state will be reached to signal that it is time to de-energise for any solenoid which is currently on.

As hereinbefore described, the circuitry preferably incorporates a time delay so that the spray nozzle will operate for a preset time after it activated. A timer circuit might be associated with the solenoid, holding it on for a preset time so that the activation signal need only be a switch on pulse. Alternately the activation signal might be held on for the requisite time.

Various changes and modifications may be made to the embodiments described and illustrated without departing from the invention as hereinafter set forth in the claims.

Some of the features of the invention may be summarised as follows.

The invention contemplates a first system for determining whether a pixel is to be deemed green, i.e:
  to use the three R, G, B, signals from the camera (which are three voltages, or, if the camera has a digital output, three digital signals) directly in the algorithm, whereby the pixel is deemed "green" if, for the pixel: G>R and G >B In another algorithm, the pixel is deemed "green" if, for the pixel: G>R and B <a predetermined value.

The invention also contemplates an alternative system for determining whether a pixel is to be deemed green, i.e:
  the R, G, B signals from the camera are not used directly in the algorithm, but rather the R, G, and B signals are aggregated to produce a value for the light intensity (luminance, Y) according to the conventional formula:

$$Y=0.30*R+0.59*G+0.11*B$$

Thus, in the alternative, the algorithm for determining whether the pixel is or is not green is: the pixel is deemed "green" if, for the pixel: G−Y>R−Y and G−Y>B−Y.

The invention also contemplates the inclusion of a means for alleviating the effects of overexposure and underexposure of the scanned area.

When the areas of extreme light are infrequent, one solution is to activate the spray solenoids in these areas by default. The added security of ensuring that no "green" areas are missed is paid for with a slight increase in chemical usage.

To be able to discern these extreme light levels a signal known as "Luminance" is developed from the Red, Green and Blue signals from the camera. The signal in given as $$Luminance=(0.3*Red)+(0.59*Green)+(0.11*Blue)$$

Luminance basically represents the image without any colour information, ie: it is what is viewed on a black and white television or on a colour television if the colour control is turned to its minimum position.

Once the luminance signal has been developed, the signal level can be monitored for the extremes of either underexposure (dark areas) or overexposure (saturated light areas).

A: These conditions can then be used to either force the system to regard them as "Green" areas and hence use the same control mechanisms as are already present in the system, or B: Preferably, brought into separate counter system which allow independent control of these conditions. This added control allows the operator to decide whether to conserve chemicals, or to ensure that no "green" areas are left unsprayed at the expense of slightly higher chemical usage.

2. PHYSICAL MEANS

Extremes of both underexposure (dark areas) and overexposure (saturated light areas) can be reduced to eliminate default spraying with a corresponding reduction in chemical usage to be fixing a light diffusing hood above the target areas and keeps the target area/signal within the dynamic range of the CCD. The reduced levels of ambient light have no adverse effect as the electronic exposure control compensates to match the light.

Patent publication DE-4,132,637 might be considered relevant to the invention, in that it shows a (non-agricultural) weed spray controller, in which weeds are detected by means of a video signal.

We claim:

1. Method for the spot-application of a spray to green weeds or other green plants in an agricultural field, characterized by the following procedural steps:

viewing an area of ground with a colour sensing means, the colour sensing means being effective to scan the area in pixelated fashion and to issue three signals, in respect of each pixel in turn of the scanned area, the three signals being dependent, respectively, upon the amount of Red, Green and Blue light reaching the colour sensing means at that pixel;

comparing the Green signal of a pixel with the Red signal and the Blue signal of the pixel, according to a predetermined algorithm relating the said three signals in respect of each pixel of the scanned area and deeming the pixel to have a "green" status or a "not green" status in accordance with the comparison;

assimilating the statuses of the pixels in a patch of the pixels, the extent of the patch being defined in that the pixels making up the patch are linked to the other pixels in the patch in accordance with a predetermined degree of spacial and temporal proximity to each other within the scanned area;

comparing the aggregate of statuses of the pixels of the patch with a predetermined value, and of deeming the status of the patch to be "green" or "not green" in accordance with the comparison; and in respect of each of a plurality of spray heads operating a spray head to produce a pulse of spray over a patch in accordance with the patch having the status of "green".

2. Method of claim 1, wherein:

the method includes the step of computing the luminance Y of the pixel; and the Red, Green, and Blue signals as used in the algorithm are R-Y, G-Y, and B-Y.

3. Method of claim 1, wherein the algorithm is of the form in which the status of the pixel is set to "green" if both (a) the Green signal exceeds the Red signal, and (b) the Green signal exceeds the Blue signal.

4. Method of claim 1, wherein the algorithm is of the form in which the status of the pixel is set to "green" if both (a) the Green signal exceeds the Red signal, and (b) the Blue signal is less than a predetermined value.

5. An agricultural spray controller by which to control agricultural spray apparatus, which controller detects green plants on a surface being treated to enable the spot application thereto of a spray, comprising:

a surface viewing means for generating a pixelated colour video output including red (R), green (G), and blue (B) (RGB) colour components representing its field of view; a pixel receiving means for determining the red, green, and blue colour components of the pixels in the video output;

a green-pixel-determining means for determining whether each pixel is to be deemed green, depending on a relationship of the colour components of the pixel;

a green-area-determining means for counting whether the number of deemed-green pixels in the video output corresponding to an area of the field of view exceeds a pre-determined number, the predetermined number is based on the number of deemed-green pixels deemed indicative of the presence of a green plant in the area;

an output means for delivering a spray activation signal responsive to the green-area-determining means when the number of deemed-green pixels in the area exceeds the predetermined number;

a first comparator to determine if G is greater than R;

a second comparator to determine if B is less than a set value; and a processor to produce an activation signal by which to activate a spray head when G exceeds R and G exceeds B, when B is below the set value.

6. An agricultural spray controller as claimed in claim 5 wherein the first and second comparators output to a digitizer through an AND circuit, the digitizer out-putting a green or not green state pixel by pixel to the processor.

7. An agricultural spray controller by which to control agricultural spray apparatus, which controller detects green plants on a surface being treated to enable the spot application thereto of a spray, comprising:

a surface viewing means for generating a pixelated colour video output including red (R), green (G), and blue (B) (RGB) colour components representing its field of view;

a pixel receiving means for determining the red, green, and blue colour components of the pixels in the video output;

a green-pixel-determining means for determining whether each pixel is to be deemed green, depending on a relationship of the colour components of the pixel;

a green-area-determining means for counting whether the number of deemed-green pixels in the video output corresponding to an area of the field of view exceeds a pre-determined number, the predetermined number is based on the number of deemed-green pixels deemed indicative of the presence of a green plant in the area; and an output means for delivering a spray activation signal responsive to the green-area-determining means when the number of deemed-green pixels in the area exceeds the predetermined number, wherein pixels are counted across a scan line, segment by segment over the area of the field of view and if the number of pixels deemed to be green in a line in a segment exceeds a threshold then the segment line is deemed green, the number of scan lines in a segment deemed green are counted and if the line count exceeds a threshold then a plant is deemed to exist in that segment of the field of view.

8. An agricultural spray controller by which to control agricultural spray apparatus, which controller detects green plants on a surface being treated to enable the spot application thereto of a spray, comprising:

a surface viewing means for generating a pixelated colour video output including red (R), green (G). and blue (B) (RGB) colour components representing its field of view;

a pixel receiving means for determining the red, green, and blue colour components of the pixels in the video output;

a green-pixel-determining means for determining whether each pixel is to be deemed green, depending on a relationship of the colour components of the pixel;

a green-area-determining means for counting whether the number of deemed-green pixels in the video output corresponding to an area of the field of view exceeds a pre-determined number, the predetermined number is based on the number of deemed-green pixels deemed indicative of the presence of a green plant in the area; and an output means for delivering a spray activation signal responsive to the green-area-determining means when the number of deemed-green pixels in the area exceeds the predetermined number, wherein the RGB colour components of a pixel are examined and if G>R and G>B then the pixel is deemed to be green.

9. An agricultural spray controller by which to control agricultural spray apparatus, which controller detects green plants on a surface being treated to enable the spot application thereto of a spray, comprising:

a surface viewing means for generating a pixelated colour video output including red (R), green (G), and blue (B) (RGB) colour components representing its field of view;

a pixel receiving means for determining the red, green, and blue colour components of the pixels in the video output:

a green-pixel-determining means for determining whether each pixel is to be deemed green, depending on a relationship of the colour components of the pixel;

a green-area-determining means for counting whether the number of deemed-green pixels in the video output corresponding to an area of the field of view exceeds a pre-determined number, the predetermined number is based on the number of deemed-green pixels deemed indicative of the presence of a green plant in the area; and an output means for delivering a spray activation signal responsive to the green-area-determining means when the number of deemed-green pixels in the area exceeds the predetermined number, wherein the RGB colour components of a pixel are examined and if G>R and B<a set threshold for blue then the pixel is deemed to be green.

* * * * *